UNITED STATES PATENT OFFICE 2,493,730

2-(p-OXYPHENYL)-3-ISOPROPYL-6-OXY-INDANES

Ulrich V. Solmssen, Essex Fells, N. J., assignor to Hoffmann-La Roche Inc., Nutley, N. J., a corporation of New Jersey No Drawing. Application October 23, 1946, Serial No. 705,236

6 Claims. (Cl. 260—479)

This invention relates to the production of new 2-phenyl indanes in which each of the six-membered rings contains an oxygen-containing radical and the 3-position a branched alkyl group. More particularly, the invention relates to the production of 2-phenyl indanes which can be represented by the following general formula:

(I)

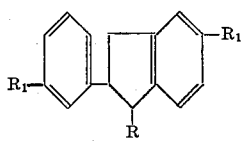

wherein R is a branched alkyl group and $R_1$ is an oxygen-containing radical such as hydroxyl; alkoxy, such as methoxy, ethoxy, and the like; or acyloxy, such as acetoxy, propionoxy, butyroxy, and the like. The substituents in the six-membered rings can be the same or different.

In my copending application, Serial No. 550,869, filed August 23, 1944, now United States Patent No. 2,447,099, there are described 2-phenyl-3-indenes, of the following formula:

(II)

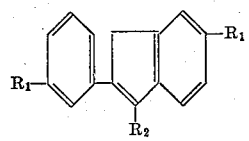

wherein $R_1$ has the same significance as in Formula I and $R_2$ is an alkyl group containing more than one carbon atom. These compounds and their method of production are also described in my paper appearing in the Journal of the American Chemical Society, volume 65 (1943) at page 2370, entitled "Synthesis of estrogenic indene derivatives and remarks on the configuration of stilbestrol." In Patent No. 2,281,956, granted to Walter Salzer, there is disclosed a compound corresponding to that of Formula II where $R_2$, however, is specifically limited to methyl.

I have now found, surprisingly, that on hydrogenation of indenes where the 3-substituent is a branched alkyl group such as isopropyl, isobutyl, tertiary butyl, isoamyl and the like, the resulting indenes which are of the type Formula I are highly active and in comparing the indene and indane series, it is found that the highest activity lies in the indane compounds. Furthermore, the 3-branched alkyl indanes are highly stable in air and in oil solution in striking contrast to the weakly stable indenes heretofore described which discolor in air and lose activity in oil solution. Accordingly, the new 3-branched alkyl indanes are more suited for use in pharmaceutical preparations.

The 2-phenyl-3-branched alkyl indanes can be prepared by hydrogenation of the corresponding phenyl indenes of the following formula:

(III)

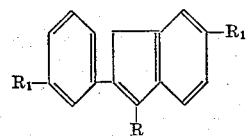

where R and $R_1$ have the same significance as in Formula I, by means of hydrogen in the presence of a catalyst of the class of noble metal catalysts and nickel. The reactions involved can be represented by the following equation:

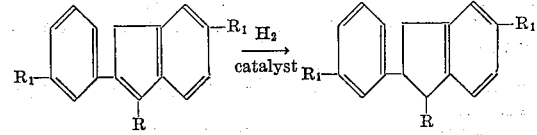

The hydrogenation can be conducted under any suitable conditions, for example, pressures may be employed ranging from atmospheric to superatmospheric and temperatures from normal room temperature to 100° C. It is preferable to perform the hydrogenation in the presence of a solvent such as, for example, alcohol, ethyl acetate, dioxane, methanol, isopropanol, acetic acid, and the like. The hydrogenation of the phenyl indene can also be carried out in an aqueous medium by employing a water-soluble salt of the phenyl-3-branched alkyl indene, as for example, the sodium or potassium salt.

In general, it is preferred to hydrogenate the ethers corresponding to Formula III where R is a branched-alkyl group and $R_1$ is alkyloxy, aralkyloxy or aryloxy, and subsequently, if desired, to dealkylate the ether indanes formed by means of dealkylating agents, such as hydrobromic acid in acetic acid, or aluminum chloride in nitrobenzene and similar dealkylation agents, in order to obtain the corresponding hydroxy compounds. Dealkylation can also be carried out by means of alkaline agents as, for example, alcoholic potassium hydroxide. It is advantageous to perform the hydrogenation on the alkoxy compounds, since the hydroxyl-phenyl indenes, as pointed out above, are relatively unstable compounds, whereas the hydroxy-phenyl indanes are relatively stable. If desired, the hydrogenation may, of course, also be carried out on the acyloxy compounds and after formation of the indane, the acyloxy group may be saponified by employing any suitable saponifying agent such as sodium hydroxide to recover the corresponding hydroxy 3-branched alkyl phenyl indanes.

The dealkylation can be stopped at a point where only one of the two alkoxy groups has been converted into hydroxyl. In this way there can be obtained monoether derivatives of the 3-branched alkyl phenyl indanes. If desired, these monoethers may be acylated by any suitable acylating agent, as for example, an acyl anhydride or an acyl chloride as, for example, acetic anhydride or propionyl chloride. In this way, mixed ether-esters are obtained which have the advantage of possessing prolonged activity.

The esterification is performed preferably in a solvent in the presence of a catalyst such as sulfuric acid or pyridine in the case of the anhydrides, and in the presence of an acid-binding agent in the case of the acyl halides to neutralize the hydrogen halide acid formed during the saponification. As examples of suitable acid-binding agents which can be employed are potassium carbonate, alkali metal or metal earth alcoholates as, for example, sodium alcoholate, magnesium alcoholate, or pyridine, quinoline, and similar acid-binding agents.

The dihydroxy compounds obtained by complete dealkylation of the ethers may also be mono, or diacylated with similar acylating agents and such diacyl derivatives may be partially saponified to obtain mono-acyloxy-3-branched alkyl-hydroxyindanes.

In this manner, there may be obtained the following compounds which are merely given by way of example, it being understood that the process is not limited to the production of only these compounds:

2-(p-hydoxyphenyl)-3-isopropyl-6-hydroxy-indane 2-(p-methoxyphenyl)-3-isopropyl-6-methoxy-indane 2-(p-hydroxyphenyl)-3-isopropyl-6-methoxy-indane 2-(p-acetoxyphenyl)-3-isopropyl-6-methoxy-indane 2-(p-acetoxyphenyl)-3-isopropyl-6-acetoxy-indane 2-(p-hydroxyphenyl)-3-isobutyl-6-hydroxy-indane 2-(p-benzoxyphenyl)-3-isopropyl-6-benzoxy-indane 2-(p-acetoxyphenyl)-3-isopropyl-6-hydroxy-indane 2-(p-hydroxyphenyl)-3-tertiary-butyl-6-hydroxy-indane The 2-phenyl-3-branched alkyl indenes employed as starting materials can in general be prepared according to the process set forth in my copending application and as described in the above-mentioned American Chemical Society article. The indanone XVI described in the Chemical Society article is subjected to a Grignard reaction with a branched-alkyl magnesium halide. For example, when the following Grignard reagents are employed; namely, isopropyl magnesium iodide, isobutyl magnesium iodide, tertiary butyl magnesium iodide, the corresponding indenes are obtained on completion of the reaction.

The 2-phenyl-3-branched alkyl indanes comprising the present invention are characterized by their exceptionally high estrogenic activity. Thus, I have found, for example, that 2-(p-hydroxyphenyl)-3-isopropyl-6-hydroxy-indane has an estrogenic activity in ovarectomized rats at dose levels of only 0.7γ subcutaneously and 10γ orally.

Furthermore, the 3-branched alkyl compounds are characterized by high stability and are conveniently employed in oil solutions as, for example, in cottonseed oil or corn oil solutions. In general, the esters and ester-ethers are longer acting than the corresponding phenol compounds.

The following examples will serve to illustrate the invention:

EXAMPLE A

*Preparation of 2-(p-methoxyphenyl)-3-isopropyl-6-methoxy-indene*

4.54 grams of magnesium metal turnings and 18 cc. of absolute ether are placed in an apparatus for preparing Grignard reagent and 31.7 grams of isopropyl iodide added in such a manner that the ether is kept constantly refluxing. After the addition of the iodide the mixture is refluxed with gentle heating and stirring for a further hour and then 190 cc. of benzol added to the mixture. To this, 10 grams of 2-(p-methoxyphenyl)-6-methoxy-1-indanone dissolved in benzol is added dropwise. After the addition the mixture is refluxed for a further two hours and after cooling, 25 cc. of 5 per cent sulfuric acid are slowly added, the mixture warmed for half an hour and the reaction mixture then allowed to separate into two layers. The ether layer is removed, washed with water and dried over sodium sulfate. After filtration the ether solution on evaporation leaves a crystalline residue which, on crystallization from methanol yields 2-(p-methoxyphenyl)-3-isopropyl-6-methoxy-indene melting at 134.5–135.5° C.

EXAMPLE B

*Preparation of 2-(p-methoxyphenyl)-3-isobutyl-6-methoxy-indene*

The Grignard reagent is prepared from 9.07 grams of magnesium, 160 cc. of absolute ether and 68.6 grams isobutyl iodide in the manner given in Example A. To this, 20 grams of 2-(p-methoxyphenyl)-6-methoxy-3-indanone dissolved in 380 cc. of benzol are added dropwise and after the addition the mixture is refluxed for two hours and then decomposed with ice with 25 cc. of 5 per cent sulfuric acid. The mixture is warmed for half an hour, the ether layer removed, washed, dried with sodium sulfate and filtered. The ether solution on evaporation gives a crystalline residue which, on recrystallization twice from methanol, yields 2-(p-methoxyphenyl)-3-isobutyl-6-methoxy-indene melting at 75.5–76.5° C.

When tertiary butyl iodide is employed in forming the Grignard agent instead of isobutyl iodide in the same manner as described in Example B, and this is reacted with the same indanone, as described, there is obtained 2-(p-methoxyphenyl)-3-tertiary-butyl-6-methoxy-indene.

EXAMPLE I 13.9 grams of 2-(p-methoxyphenyl)-3-isopropyl-6-methoxy-indene are dissolved in 150 cc. of cyclohexane and hydrogenated at 60° C. in the presence of hydrogen at 500 pounds pressure in the presence of Raney nickel. After filtration and removal of solvent, 2-(p-methoxyphenyl)-3-isopropyl-6-methoxy-indane is obtained, M. P. 87-87.5° C. This product is demethylated with 6 cc. of 48 per cent hydrogen bromide and 25 cc. of acetic acid for about 3½ hours. When a drop of reaction fluid is found to be completely soluble in dilute sodium hydroxide solution, the reaction is completed. The excess hydrogen bromide and acetic acid are removed and the residue recrystallized from 80% methyl alcohol. This yields 2-(p-hydroxyphenyl)-3-isopropyl - 6 - hydroxy-indane, M. P. 192-194° C.

EXAMPLE II

The same procedure as in Example I is followed, except that there is employed as a starting material 2-(p-methoxyphenyl)-3-isobutyl-6-methoxy-indene. There is obtained, 2-(p-methoxyphenyl)-3-isobutyl-6-methoxy - indane, which, on dealkylation as described in Example I yields 2-(p-hydroxyphenyl)-3-isobutyl - 6 - hydroxy-indane, M. P. 197-200° C. when recrystallized from 80 per cent methanol.

Following the same procedure as in Example I, there may be obtained the followin compounds:

(a) 2-(p-hydroxyphenyl)-3-isopropyl-6-methoxy-indane

To obtain this compound, the dealkylation step is carried out partially so that only one methoxy group is removed from the intermediate dimethoxy-indane. By acetylating the monomethoxy compound with acetic anhydride in the presence of dilute sulfuric acid, there is obtained the mixed ester-ether, 2-(p-acetoxyphenyl)-3-isopropyl-6-methoxy-indane.

(b) 2-(p-benzoxyphenyl)-3-isopropyl-6-benzoxy-indane

This is obtained by employing as a starting material in Example I, the corresponding indene, 2-(p - benzoxyphenyl)-3-isopropyl - 6 - benzoxy-indene.

(c) 2-(p-acetoxyphenyl)-3-isopropyl-6-hydroxy-indane

This is obtained by starting with the corresponding 2-(p-acetoxyphenyl)-3-isopropyl-6-acetoxy-indene and partially saponifying the resulting diacetoxy-indane obtained on hydrogenation so that only one acetyl group is removed or, alternatively, removing both acetyl groups to form hydroxy groups and acylating only one of the hydroxy groups.

I claim:
1. 2-(p-hydroxyphenyl)-3-isopropyl - 6 - hydroxy-indane.
2. 2-(p-acetoxyphenyl)-3-isopropyl-6 - methoxy-indane.
3. 2-(p-methoxyphenyl)-3-isopropyl-6 - methoxy-indane.
4. 2-(p-oxyphenyl)-3-isopropyl - 6 - oxy - indanes.
5. 2-(p-alkoxyphenyl)-3-isopropyl-6 - alkoxy-indanes.
6. 2-(p-acyloxyphenyl)-3-isopropyl-6-alkoxy - indanes.

ULRICH V. SOLMSSEN.

REFERENCES CITED

The following references are of record in the file of this patent:

UNITED STATES PATENTS

| Number | Name | Date |
|---|---|---|
| 2,281,956 | Salzer | May 5, 1942 |
| 2,447,099 | Solmssen | Aug. 17, 1948 |

OTHER REFERENCES

Padoa et al., "Gaz. Chim. Ital.," vol. 39, pt. I, page 330.

Masson, "Chemical Abstracts," vol. 39 (1945), page 2120.

Fieser et al., "Organ. Chem." (D. C. Heath & Co., 1944), page 142.

Plentl et al., Jour. Am. Chem. Soc., vol. 63, 989-995 (1941).

Certificate of Correction

Patent No. 2,493,730 January 3, 1950

ULRICH V. SOLMSSEN

It is hereby certified that errors appear in the printed specification of the above numbered patent requiring correction as follows:

Column 1, line 49, for "indenes" read *indanes*; column 2, line 52, for "hydroxylphenyl" read *hydroxy-phenyl*;

and that the said Letters Patent should be read with these corrections therein that the same may conform to the record of the case in the Patent Office.

Signed and sealed this 25th day of April, A. D. 1950.

[SEAL]

THOMAS F. MURPHY,
*Assistant Commissioner of Patents.*